United States Patent
Zobel et al.

(10) Patent No.: US 6,901,794 B2
(45) Date of Patent: Jun. 7, 2005

(54) MULTIPLE TECHNOLOGY FLOW SENSOR

(75) Inventors: Hans-Joerg Zobel, Lloyd Harbor, NY (US); Karl-Heinz Förster, Dresden (DE); Josef Binder, Huntington, NY (US)

(73) Assignee: Festo Corporation, Hauppauge, NY (US)

( * ) Notice: Subject to any disclaimer, the term of this patent is extended or adjusted under 35 U.S.C. 154(b) by 0 days.

(21) Appl. No.: 10/686,931

(22) Filed: Oct. 16, 2003

(65) Prior Publication Data

US 2005/0081621 A1    Apr. 21, 2005

(51) Int. Cl.[7] ................................................. G01F 1/68
(52) U.S. Cl. ................................... 73/204.26; 73/715
(58) Field of Search ........................ 73/204.26, 204.25, 73/204.23, 715, 719, 720, 716

(56) References Cited

U.S. PATENT DOCUMENTS

| | | | |
|---|---|---|---|
| 3,424,000 A | 1/1969 | Chelner et al. | |
| 3,927,565 A | 12/1975 | Pavlin et al. | |
| 4,530,244 A * | 7/1985 | Starr | 73/727 |
| 4,565,098 A | 1/1986 | Herzl | |
| 4,729,244 A | 3/1988 | Furuse | |
| 4,875,932 A | 10/1989 | Uchiyama et al. | |
| 4,986,127 A | 1/1991 | Shimada et al. | |
| 5,000,226 A | 3/1991 | Stoll et al. | |
| 5,144,843 A * | 9/1992 | Tamura et al. | 73/727 |
| 5,187,984 A | 2/1993 | Mosser et al. | |
| 5,259,248 A * | 11/1993 | Ugai et al. | 73/721 |
| 5,348,047 A | 9/1994 | Stoll et al. | |
| 5,383,470 A | 1/1995 | Kolbly | |
| 5,458,048 A | 10/1995 | Hohner | |
| 5,463,904 A | 11/1995 | Kalinoski | |
| 5,469,749 A | 11/1995 | Shimada et al. | |
| 5,495,769 A | 3/1996 | Broden et al. | |
| 5,503,034 A * | 4/1996 | Amano et al. | 73/862.473 |
| 5,546,794 A | 8/1996 | Kuhn et al. | |
| 5,717,147 A | 2/1998 | Basch et al. | |

(Continued)

FOREIGN PATENT DOCUMENTS

DE    3732856    4/1989

(Continued)

OTHER PUBLICATIONS

Jorgensen, Finn E., "How to Measure Turbulence with Hot-Wire Anemometers", Dantec Dynamics, Publication No. 9040U6151, Feb. 1, 2002.

*Primary Examiner*—Harshad Patel
(74) *Attorney, Agent, or Firm*—Hoffmann & Baron, LLP (57) ABSTRACT

A flow sensor includes sensors connected to a flexible membrane. The sensors detect ambient temperature, pressure, and flow rate of a medium. A method of sensing flow rate includes providing the flexible membrane; coupling the plurality of sensors to the flexible membrane; and detecting ambient temperature, pressure, and flow rate of the medium by the sensors. A flow sensing system includes the flow sensor, an operational amplifier, and a closed loop controller. The sensors are connected in a Wheatstone bridge configuration. The operational amplifier is connected to the Wheatstone bridge and outputs a pressure signal representative of the pressure of the medium. The closed loop controller is connected to the operational amplifier and controls a current through a heating element for a resistor in the bridge such that a voltage across the operational amplifier is substantially zero. The output of the closed loop controller represents the flow rate.

32 Claims, 5 Drawing Sheets

U.S. PATENT DOCUMENTS

| | | | |
|---|---|---|---|
| 5,791,369 A | 8/1998 | Nishino et al. | |
| 5,820,262 A | 10/1998 | Lechner | |
| 5,868,159 A | 2/1999 | Loan et al. | |
| 5,877,423 A * | 3/1999 | Mattsson | 73/708 |
| 5,883,310 A | 3/1999 | Ho et al. | |
| 5,899,962 A | 5/1999 | Louwagie et al. | |
| 5,965,813 A | 10/1999 | Wan | |
| 6,023,969 A | 2/2000 | Feller | |
| 6,295,874 B1 | 10/2001 | Strutt et al. | |
| 6,343,514 B1 * | 2/2002 | Smith | 73/719 |
| 6,408,698 B1 | 6/2002 | Brereton et al. | |
| 6,443,328 B1 | 9/2002 | Fehl et al. | |
| 6,470,741 B1 * | 10/2002 | Fathollahzadeh | 73/204.15 |
| 6,542,761 B1 * | 4/2003 | Jahn et al. | 600/310 |
| 6,561,216 B2 | 5/2003 | Kurosawa | |
| 6,615,867 B2 | 9/2003 | Tajima et al. | |
| 6,625,029 B2 * | 9/2003 | Bernini | 73/721 |
| 6,631,638 B2 | 10/2003 | James et al. | |

FOREIGN PATENT DOCUMENTS

| | | |
|---|---|---|
| DE | 195 02 499 A1 | 8/1996 |
| EP | 0 087 621 | 8/1983 |
| EP | 0305134 | 3/1989 |
| EP | 0 381 775 A1 | 8/1990 |
| EP | 0 561 365 A2 | 9/1993 |
| JP | 3-18735 | 1/1991 |

* cited by examiner

MULTIPLE TECHNOLOGY FLOW SENSOR

BACKGROUND OF THE INVENTION

1. Field of the Invention

The present invention generally relates to a flow sensor for measuring the flow rate of gaseous media, such as air, and relates more particularly to a multiple technology flow sensor suitable for measuring various physical characteristics of gaseous media, such as pressure, temperature, and flow rate, which may be used to enhance the accuracy of flow rate measurements.

2. Description of the Prior Art

There are essentially three prevailing methods used to measure the flow of gaseous media. The first is inferential flow measurement, which senses a difference in pressure across a restricted orifice. The second method uses a thermal sensor, which is also referred to as a constant temperature anemometer, to monitor temperature changes that are dependant upon the speed of the medium. This method is described in U.S. Pat. No. 6,470,741 to Fathollahzadeh, which is incorporated herein by reference. The third method utilizes displacement sensors that detect mechanical displacement of a portion of the sensor caused by the flow of gas.

Each of these methods has different application ranges, as well as inherent advantages and disadvantages. Inferential flow measurement generally requires two pressure sensors and a restriction in flow. A temperature sensor is also typically required with this method to compensate for variations in pressure due solely to temperature fluctuations. However, the requirement of multiple sensors substantially increases the rate of failure and cost of installation. Thus, application of inferential flow measurement principles becomes practical in only limited circumstances.

The remaining two flow sensing methods do not require multiple sensors, but have other drawbacks. Typically, thermal sensors are used for lower flow rates while displacement sensors are used for relatively higher flow rates. Selection of the most appropriate flow sensor for a particular application requires a detailed knowledge of the anticipated range of measurements, the potential physical characteristics of the medium, such as temperature and pressure, as well as the environmental characteristics of the location in which the medium is to be measured. Accordingly, use of either thermal sensors or displacement sensors generally requires a customized solution for each particular application.

Conventional methods of measuring flow rate typically involve the use of separate dedicated sensors. These sensors are often located at significant distances from each other, which necessitate the use of external wiring and/or interface assemblies, as well as substantially increasing the size, cost, and space requirements of the system.

In addition, most flow rate sensors do not compensate for the effect of temperature or pressure in the flow rate measurement. Accordingly, such measurements may be highly inaccurate, particularly when taken over a wide range of conditions.

OBJECTS AND SUMMARY OF THE INVENTION

It is an object of the present invention to provide a multiple technology flow sensor and a method for determining flow rate that have generic applicability and do not require substantial modification over a wide range of pressure, temperature, and types of media.

It is another object of the present invention to provide a multiple technology flow sensor and method for determining flow rate that utilize both thermal and displacement sensing to measure temperature, pressure, and flow rate over an extended range of physical conditions.

It is yet another object of the present invention to provide a multiple technology flow sensor and method for determining flow rate that are able to simultaneously or sequentially characterize physical characteristics of gaseous media, such as temperature and pressure, which may then be used to compensate and significantly improve the accuracy of flow rate measurements.

It is still another object of the present invention to provide a multiple technology flow sensor and method for determining flow rate that reduce the size, cost, and space requirements of the sensor by incorporating multiple sensors within a single housing.

It is a further object of the present invention to provide a multiple technology flow sensor and method for determining flow rate that simplify the manufacture of the sensor.

It is still a further object of the present invention to provide a multiple technology flow sensor and method for determining flow rate that substantially eliminate external wiring and supplemental interfacing hardware requirements.

It is yet a further object of the present invention to provide a multiple technology flow sensor and method for determining flow rate that significantly increase measurement accuracy by substantially reducing the effect of environmental factors on flow rate measurements.

A flow sensor formed in accordance with the present invention, which incorporates some of the preferred features, includes a flexible membrane and a plurality of sensors. The plurality of sensors is operatively connected to the flexible membrane. At least one of the plurality of sensors is adapted for detecting ambient temperature, pressure, and the flow rate associated with the medium.

A method of sensing flow rate of a medium in accordance with the present invention, which incorporates some of the preferred features, includes the steps of providing a flexible membrane, coupling at least one of a plurality of sensors operatively to the flexible membrane, and detecting ambient temperature, pressure, and flow rate of the medium by at least one of the plurality of sensors.

A flow sensing system formed in accordance with the present invention includes the flow sensor, an operational amplifier, and a closed loop controller. The plurality of sensors includes at least four resistors operatively connected in a Wheatstone bridge configuration that are used to measure ambient temperature, pressure, and flow rate associated with a gaseous medium. The operational amplifier is operatively connected to the Wheatstone bridge and outputs a pressure signal representative of the pressure of the medium. The closed loop controller is selectively connected to the operational amplifier and controls an electrical current through a heating element for one of the resistors in the Wheatstone bridge, such that a voltage across the inputs of the operational amplifier is substantially zero. The output of the closed loop controller is representative of the flow rate of the medium.

These and other objects, features, and advantages of the invention will become apparent from the following detailed description of illustrative embodiments thereof, which is to be read in connection with the accompanying drawings.

DETAILED DESCRIPTION OF THE PREFERRED EMBODIMENTS

In order to measure the flow rate of media, which is the volume or mass per unit time, additional physical characteristics, such as temperature and pressure, are preferably used to enhance the precision of the flow measurement. A multiple technology flow sensor formed in accordance with the present invention measures the flow of media, such as a gas, liquid, slurry, composition, and the like, but preferably air. The sensor detects the amount of electrical current required to maintain a body at a uniform temperature, and compensates this measurement with temperature and pressure information, which is also detected simultaneously or sequentially by the sensor.

Figure 1:
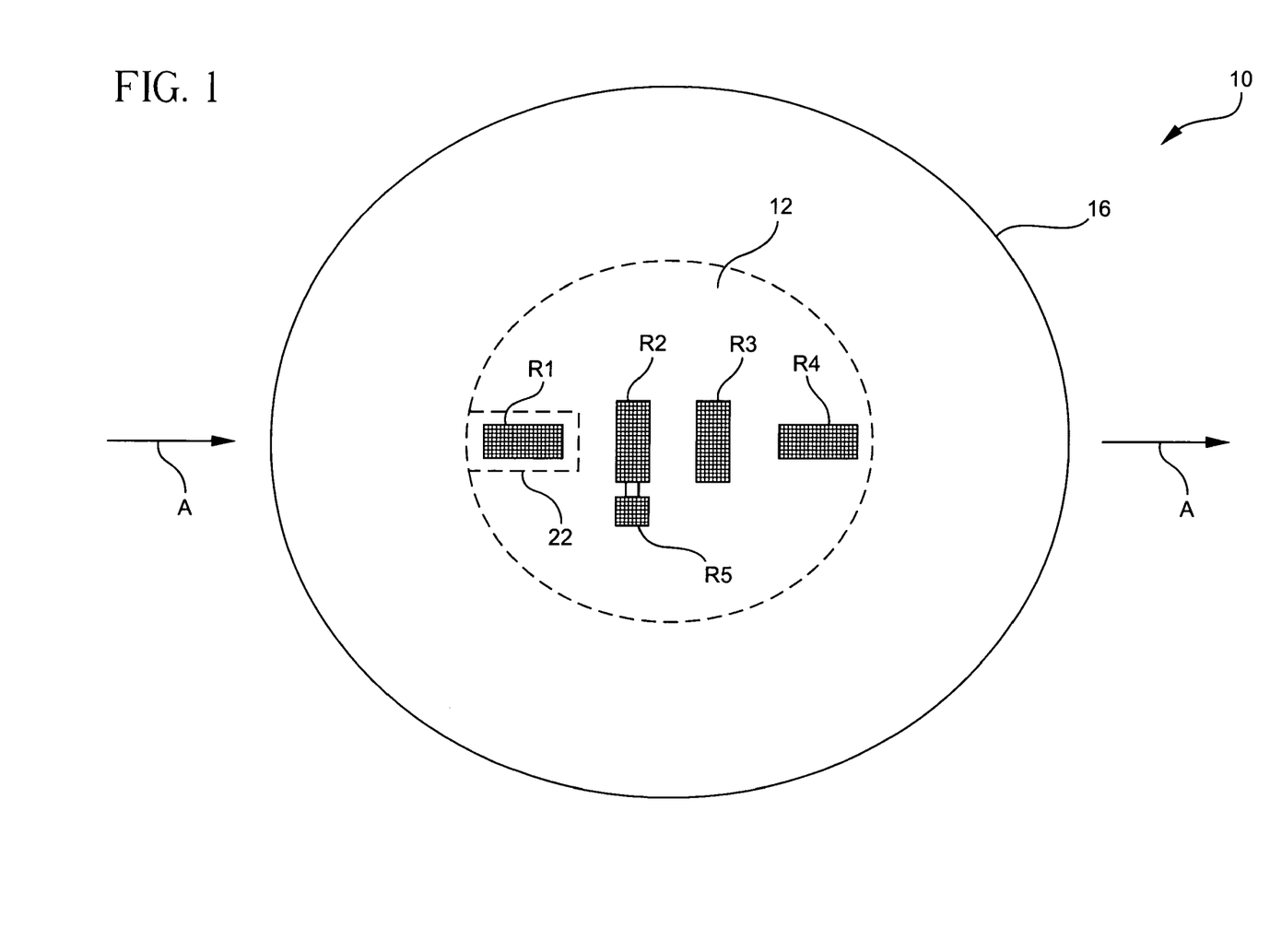
FIG. 1 is a top view of a multiple technology flow sensor formed in accordance with the present invention.

FIG. 1 shows a top view of a preferred embodiment of the flow sensor 10, which includes a Wheatstone bridge disposed on a wafer 16. The Wheatstone bridge preferably includes four resistors or sensing elements R1, R2, R3, and R4, at least a portion of which measure the flow rate (O), pressure (p), and temperature (T) of the media. The flow of media is preferably directed across the sensors, as indicated by arrow A in FIGS. 1, 2, 5a, and 5b.

FIG. 1 also shows a preferred placement of the four resistors R1, R2, R3, R4, at least some of which function as strain gauges during a pressure measurement or thermal sensors during a temperature measurement, on a membrane 12. When used as strain gauges, the resistors R1, R2, R3, and R4 are preferably configured in a full bridge configuration. Resistors R1 and R4 are preferably located near the edge of the membrane or diaphragm 12, and resistors R2 and R3 are preferably located near the middle of the membrane 12.

Figure 2:
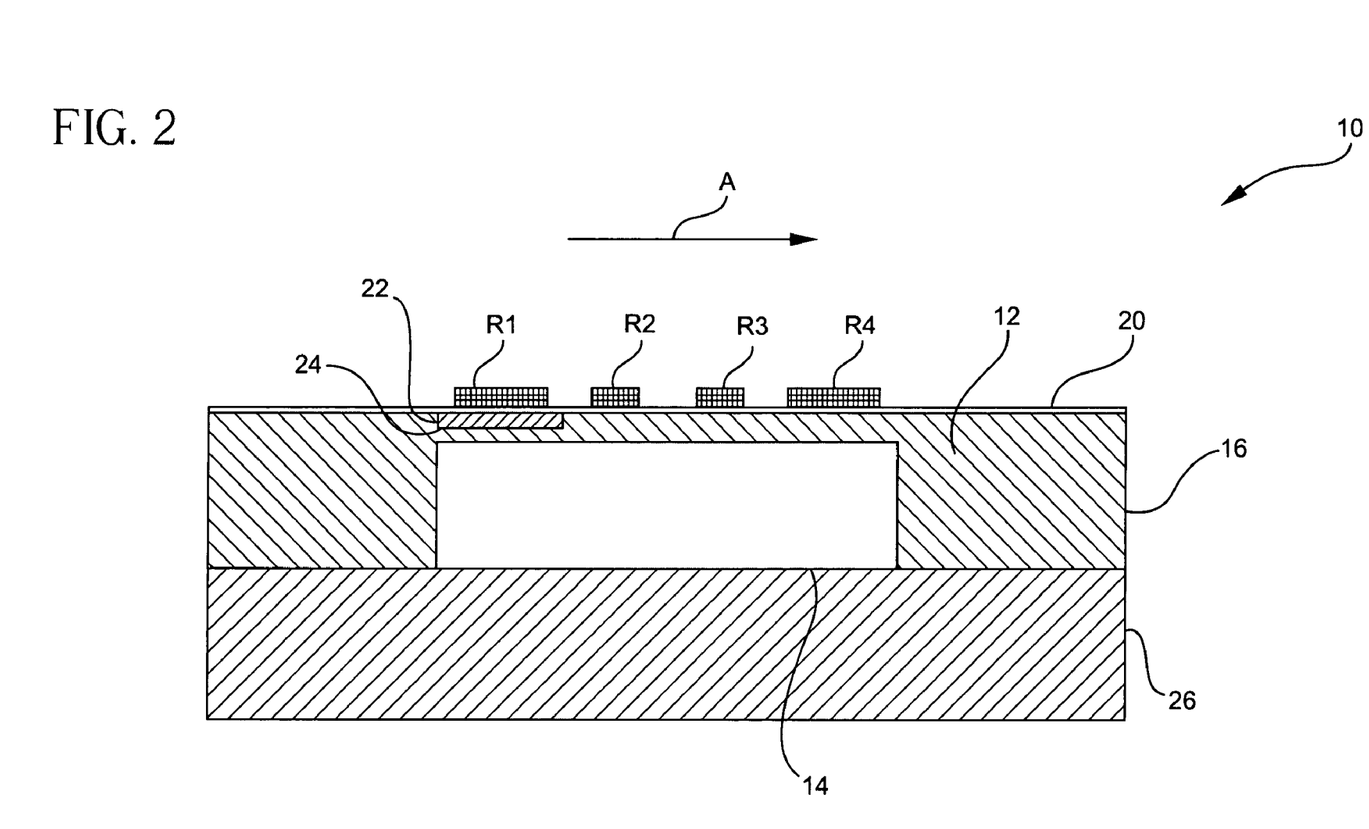
FIG. 2 is a side cross-sectional view of the multiple technology flow sensor formed in accordance with the present invention.

As shown in FIG. 2, the membrane 12 preferably covers a cavity 14 in the wafer 16, which provides a flexible surface that is displaced in response to changes in the absolute pressure of the medium being measured. This displacement is detected by resistors R1, R2, R3, and R4 when acting as strain gauges.

Resistors R1 and R4 preferably exhibit a negative elongation or are elongated by displacement of the membrane 12, which occurs in response to an increase in the pressure of the medium. Resistors R2 and R3 preferably exhibit a positive elongation or are compressed by displacement of the membrane 12, which occurs in response to an increase in the pressure of the medium.

The negative elongation of resistors R1 and R4 is preferably designed to be about equivalent to the positive elongation of resistors R2 and R3 to simplify compensation for these quantities in the full Wheatstone bridge. Equivalence of these elongations is preferably achieved through placement of the resistors R1, R2, R3, and R4 on the membrane 12, which may be determined by, for instance, computer modeling and/or simulation.

The elongation of resistors R1, R3 and R2, R4 creates a measurable output signal from the full bridge circuit. As shown in FIG. 1, resistors R1 and R4 are preferably oriented longitudinally, that is, with the longest dimensions of R1 and R4 being substantially parallel to the direction of flow A. Resistors R2 and R3 are preferably oriented transversely, that is, with the longest dimensions of R2 and R3 being substantially perpendicular or positioned across the direction of flow A. However, it is anticipated that the resistors R1, R2, R3, and R4 may be disposed in any orientation and/or position on the membrane 12 while remaining within the scope of the present invention.

At least a portion of the Wheatstone bridge is also preferably used as a constant temperature anemometer to measure the mass flow rate of the medium. During the measurement of flow rate, resistor R1 is preferably used as a hot film sensing element, resistor R2 is preferably used as a temperature sensing element, and resistors R3 and R4 are preferably passive with respect to changes in temperature and are used to complete the bridge circuit.

The resistor R2 is preferably used to measure the ambient temperature, which may then be used to compensate flow rate measurements. Resistor R2 is also used as a general-purpose temperature-sensing element for the entire flow-pressure-temperature (QpT) device formed in accordance with the present invention.

Figure 4:
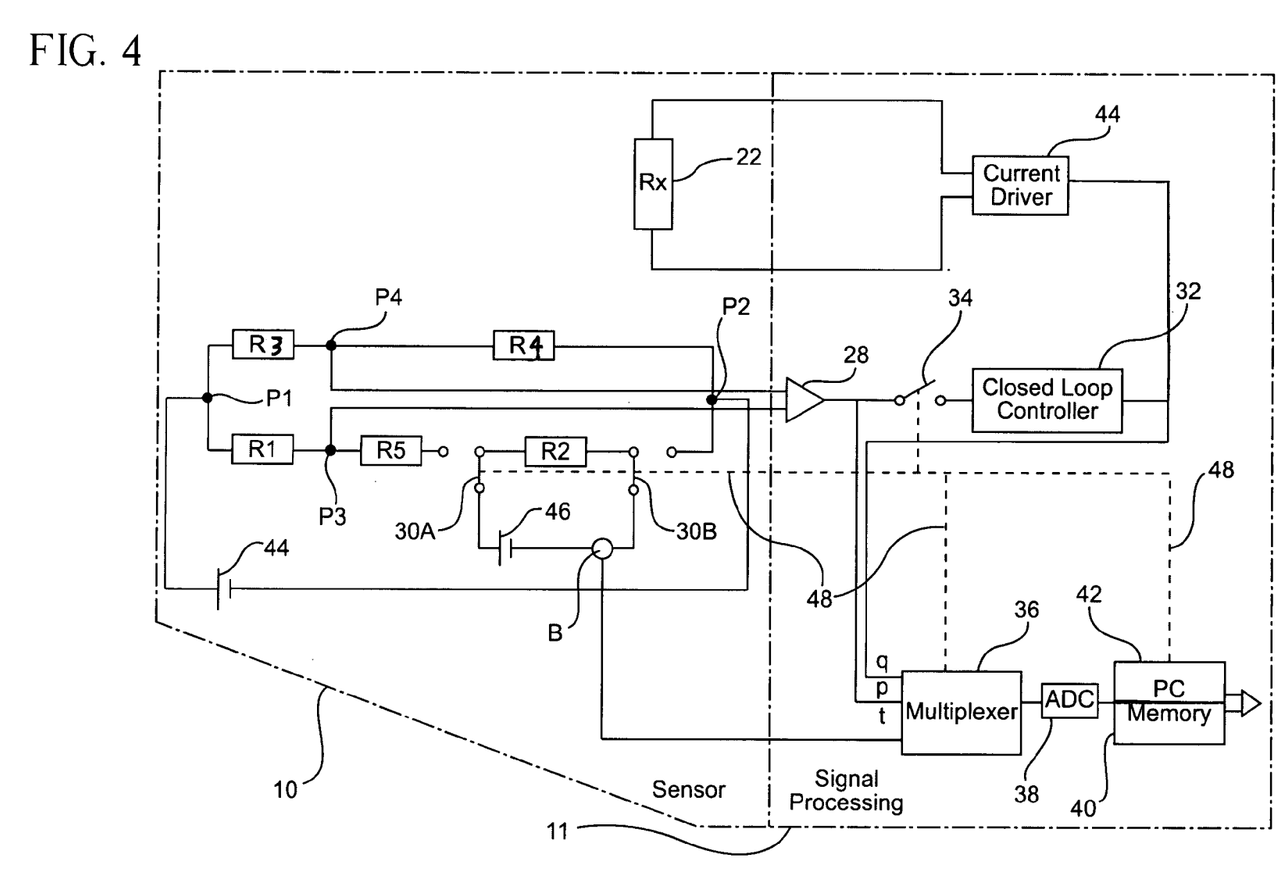
FIG. 4 is a block diagram of the multiple technology flow sensor formed in accordance with the present invention, which is operatively coupled to a preferred embodiment of signal processing hardware.

The Wheatstone bridge preferably also includes additional trimming resistors, such as trimming resistor R5 shown in FIGS. 1 and 4, which are preferably cut to yield a desired resistance. These trimming resistors are preferably used to compensate for offset voltages due to imbalances in the branches of the Wheatstone bridge.

FIG. 4 shows a block diagram of a preferred embodiment of a flow sensing system, which includes the flow sensor 10 formed in accordance with the present invention operatively coupled to an embodiment of signal processing hardware 11. The embodiment of the signal processing hardware 11 shown in FIG. 4 is intended to illustrate one example of how the flow sensor 10 of the present invention may be utilized to process measured data so that the advantages of the flow sensor 10 may be realized, but is not intended to limit the scope of the present invention or the scope of alternative embodiments of the signal processing hardware 11.

An electrical current is preferably applied to heating element 22, which is used to heat resistor R1, and maintain a substantially constant temperature difference between resistor R1 and the ambient temperature. The amount of current required to maintain resistor R1 at a constant temperature differential is preferably used as a measure of the flow rate and reflected in the output of a closed loop controller 32. Resistor R2 is preferably of the type PT 1000, which exhibits a positive temperature coefficient of about 100.

A MEMS (Micro-Electro-Mechanical System) structure of the flow sensor formed in accordance with the present invention will now be described. MEMS refers to the integration of mechanical and electrical elements on a common silicon substrate by utilizing microfabrication techniques. The electronic circuits are preferably fabricated using IC (Integrated Circuit) processes, such as CMOS (Complementary Metal Oxide Semiconductor), bipolar, or BICMOS (Bipolar Complementary Metal Oxide Semiconductor) processes. The micromechanical components are preferably fabricated using compatible micromachining processes, which selectively etch away portions of the silicon wafer or add new structural layers to form mechanical and electromechanical devices.

The flow sensor 10 formed in accordance with the present invention is preferably manufactured using silicon planar technology and micromachining by techniques similar to those described in U.S. Pat. No. 5,144,843 to Tamura et al., which is incorporated herein by reference. One functional element of the flow sensor 10 shown in FIGS. 1 and 2 is the thin silicon membrane 12, which is preferably etched from bulk silicon by either an isotropic or anisotropic wet etching process. The resistors R1, R2, R3, and R4 are disposed above the membrane 12, and are preferably designed, oriented, and positioned to optimize an output signal representing the pressure of the medium.

The resistors R1, R2, R3, and R4 are preferably formed from a layer that is deposited on the silicon wafer 16 by a PVD (Physical Vapor Deposition) or CVD (Chemical Vapor Deposition) process. This layer, and consequently the resistors R1, R2, R3, and R4, are preferably manufactured from platinum, nickel/chromium, or doped polysilicon. Photolithographic techniques are preferably used to define the dimensions of the resistors R1, R2, R3, and R4. An electrically isolating layer 20, which may be formed from silicon dioxide, is preferably used to separate the resistors R1, R2, R3, and R4 from the membrane 12.

The area below the resistor or hot-film sensing element R1 is preferably occupied by the heating element 22, as shown in FIGS. 1 and 2 which is preferably a resistive element. The heating element 22 preferably includes a thin film layer of platinum or polysilicon, which is deposited below the resistor R1. The heating element 22 is preferably isolated from the resistor R5 on its top side by the isolating layer 20. The heating element 22 is also preferably isolated from the semiconductor chip or wafer 16 on its bottom side by another isolating layer 24, which may also be manufactured from silicon dioxide.

Figure 3:
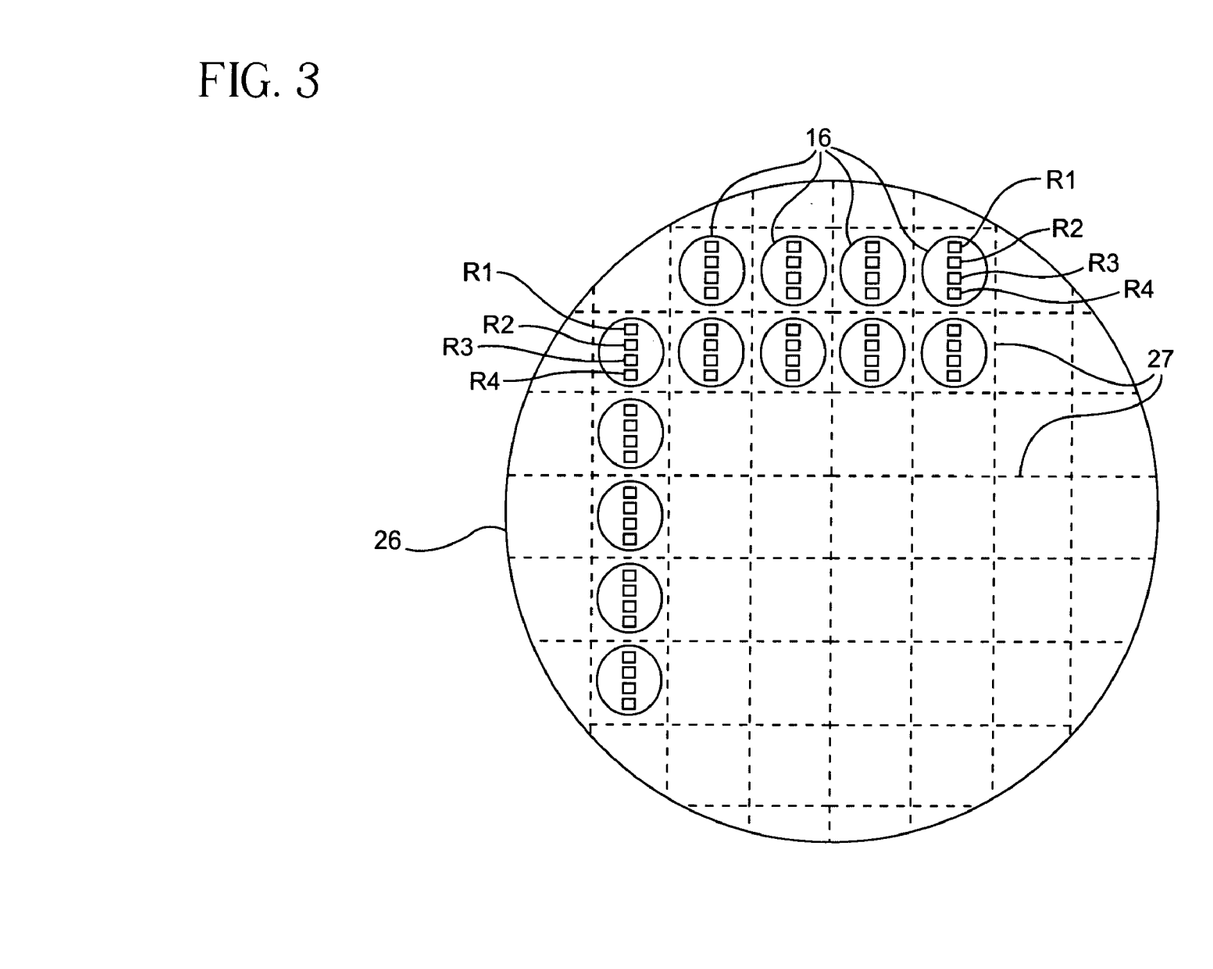
FIG. 3 is a top view of a substrate including a plurality of flow sensors formed in accordance with the present invention prior to cutting to form individual devices or chips.

As shown in FIG. 2, the wafer 16 is preferably bonded to a substrate 26 by a wafer bonding technique, following which the wafer 16 and substrate 26 are cut to form individual devices or chips 27, as shown in FIG. 3. As shown in FIG. 2, the substrate 26 functions as a passive mechanical support for the wafer 16 and the components disposed thereon, and provides a base for the cavity 14. Both the wafer 16 and the substrate 26 are preferably manufactured from silicon. The wafer bonding technique is preferably performed in a vacuum, which creates the evacuated cavity 14 having a pressure Po that is equal to about zero.

The cavity 14 preferably enables pressure to be measured by resistors R1, R2, R3, and R4 in response to deflection of the membrane 12. The cavity 14 also provides thermal isolation between the resistors R1, R2, R3, and R4, as well as between the wafer 16 and the resistors R1, R2, R3, and R4 during flow rate measurements. In this way, heat applied to the resistor R1 is efficiently transferred directly to the flow of the medium by convection. Accordingly, cross sensitivities between pressure and temperature are substantially eliminated, which significantly enhances accuracy.

In the full bridge configuration of the flow sensor 10 shown in FIG. 4, the hot film sensing element resistor R1 is preferably heated to and maintained at a temperature of about 300° C. during flow rate measurements by the separate heating element 22, which is also shown in FIGS. 1 and 2. When not using R1 as a flow sensor, the heating element 22 beneath R1 is preferably turned off and R1 is allowed to cool to ambient temperature, which preferably takes about 8 milliseconds. As described above, the remaining resistors R2, R3, and R4 are preferably thermally isolated from the hot film element resistor R1 by the membrane 12. The shape and dimensions of the membrane 12 are preferably determined by the requirements of a particular application, such as range and sensitivity.

The heating element 22 preferably includes a platinum layer, which is deposited below resistor R1 and isolated from resistor R1 by the isolating layer 24. Electrical connections to the heating element 22 are preferably brought to the edge of the wafer 16 and isolated from the remaining components in the Wheatstone bridge.

The ambient temperature is preferably measured directly from resistor R2 by using switches 30A and 30B, which are preferably controlled by the computer 42, as indicated by a dashed line 48. Switches 30A and 30B selectively either connect resistor R2 with the remaining circuitry in the Wheatstone bridge or connect resistor R2 in parallel across a voltage source 46. The resistance of R2 determines the voltage at node B, which is preferably input to an analog-to-digital converter (ADC) 38 through a multiplexer 36. The computer 42 preferably uses a digital value, which is obtained from the ADC 38, corresponding to this voltage to determine the ambient temperature.

As shown in FIG. 4, resistors R1, R2, R3, and R4 are preferably connected in a Wheatstone bridge configuration with trimming resistor R5. Resistors R1 and R3 are connected at node P1, resistors R3 and R4 are connected at node P4, resistors R1 and R5 are connected at node P3, and resistors R2 and R4 are connected at node P2. A voltage source 44 is preferably connected in parallel across nodes P1 and P2.

Nodes P3 and P4 are preferably connected to the inverting and non-inverting terminals of an operational amplifier 28, respectively. The output of the operational amplifier 28 is preferably connected to a closed loop controller 32 through a switch 34, which is preferably controlled by the computer 42 as indicated by the dashed line 48. The output of the operational amplifier 28 is also connected to the ADC 38 through the multiplexer 36, which is preferably controlled by the computer 42.

The output of the closed loop controller 32 is preferably connected to a current driver circuit 44, which selectively provides current to the heating element 22 that maintains resistor R1 at the desired temperature. The output of the closed loop controller 32 is also preferably input to the ADC 38 through the multiplexer 36, under the control of the computer 42, so that the computer 42 is able to selectively monitor the flow rate of the medium.

The sensor formed in accordance with the present invention preferably measures temperature (T), pressure (p), and flow (Q) in a sequential multiplexed process. The first step of the process preferably includes obtaining a pressure measurement from the media at room temperature using resistors R1, R2, R3, and R4.

The second step of the process preferably includes measuring the ambient temperature using resistor R2, as described above. The results of the temperature and pressure measurements may then be used to compensate for cross-sensitivities between temperature, pressure, and flow. To provide optimal compensation for the effects of ambient temperature, the temperature of the resistor R2 is preferably about equal to the ambient temperature, which minimizes the loss of thermal energy.

Temperature measurements provided by resistor R2 are preferably used to compensate for flow rate measurements obtained from resistor R1. For example, during a flow rate measurement, resistor R1 is preferably heated to and maintained at a substantially constant temperature of about 300° C. The temperature of resistor R1 is determined by its resistance, which is measured by the Wheatstone bridge. The flow of media cools resistor R1, which then requires a specific amount of current to maintain the resistor R1 at 300° C. This value of current represents the flow rate.

However, the specific amount of current required to counteract the cooling effect of the media flow depends on the ambient temperature. For instance, as the ambient temperature increases, less current is required to maintain resistor R1 at 300° C. Thus, ambient temperature is used in accordance with the present invention to compensate for the amount of current required to maintain the resistor R1 at 300° C. This ensures that flow rate measurements remain substantially independent of the ambient temperature.

The final step in the process in accordance with the present invention preferably includes measuring the flow rate by applying a current to the heating element 22, which is shown in FIGS. 1–3, to heat resistor R1. The time required to raise the temperature of resistor R1 from room temperature to the desired temperature is in the range of about 1–5 milliseconds.

As described above, resistors R1, R2, R3, and R4 are deformed in proportion to the pressure of the medium. The full Wheatstone bridge is used to determine this pressure. The voltage between nodes P3 and P4 preferably represents the absolute pressure of the medium and is inputted to the operational amplifier 28. Thus, the voltage at the output of the operational amplifier 28 is applied to the multiplexer 36, which selectively provides an analog signal representing pressure to the ADC 38. The ADC 38 then digitizes this analog signal and provides the corresponding digital signal representing pressure to the computer 42.

The computer 42 preferably provides correction, compensation, and/or calibration of parameters provided by the ADC 38, such as sensor offset, gain, temperature sensitivity, non-linearity, and calibration coefficients. These parameters are preferably programmed into memory 40, such as non-volatile flash memory, and are available for use in compensation algorithms performed during subsequent measurements.

The current necessary to keep resistor R1 at a constant temperature differential with respect to the ambient temperature is used to measure the flow rate Q. For flow rate measurements, switch 34 is preferably closed and the multiplexer 36 is selected to direct the output of the closed loop controller 32 to the ADC 38. The closed loop controller 32 preferably operates to ensure that the voltage between nodes P4 and P3 is maintained at about zero by selectively controlling the amount of current delivered to the heating element 22, and thus the resistance of resistor R1. The output of the closed loop controller 32 is selected by the computer 42, via the multiplexer 36, for digital conversion by the ADC 38. The output of ADC 46 is then preferably provided to the computer 42 as a digital representation of the flow rate.

Figure 5A:
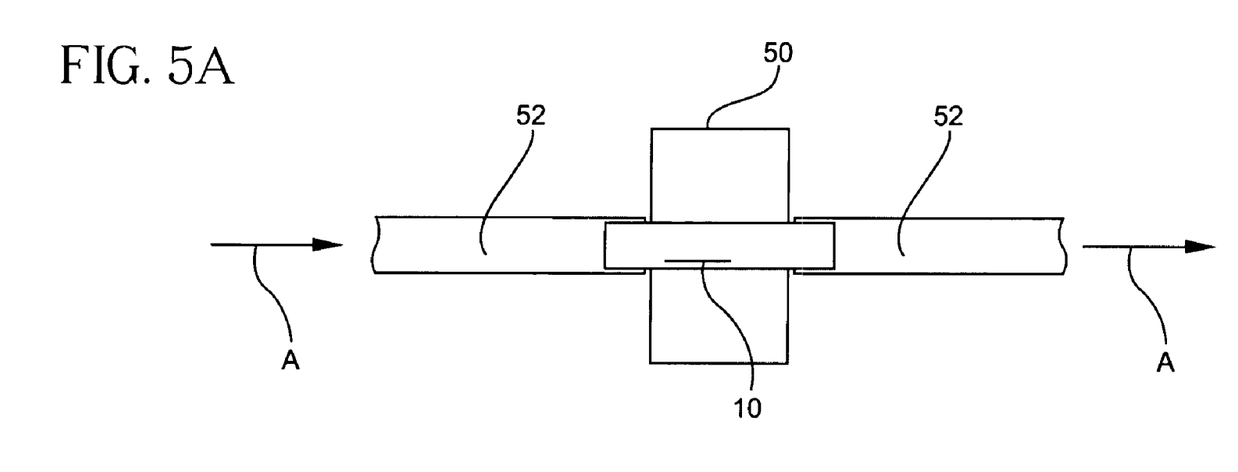
FIG. 5a is a side cross-sectional view of a first embodiment for mounting the multiple technology flow sensor formed in accordance with the present invention.
Figure 5B:
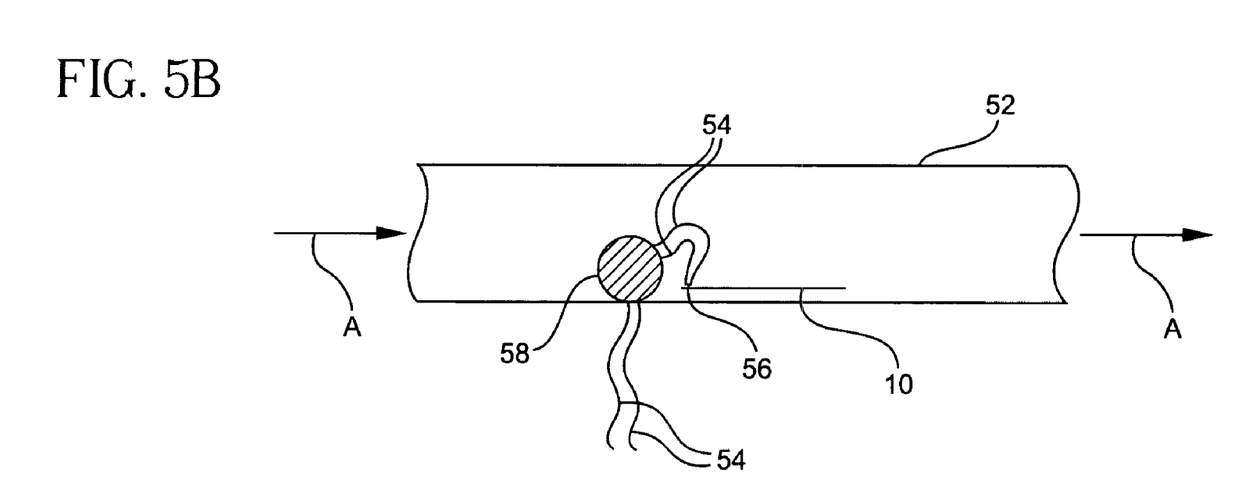
FIG. 5b is a side cross-sectional view of a second embodiment for mounting the multiple technology flow sensor formed in accordance with the present invention.

As shown in FIG. 5a, the flow sensor 10 may be incorporated into an in-line module 50, to which segments of a conduit 52 are attached. Additional components and wiring to these components are preferably located internal and/or external to the module 50. Alternatively, the flow sensor 10 may be mounted by any known means to an internal surface of the conduit 52, as shown in FIG. 5b, or suspended within the conduit 52. Interconnection between components in the flow sensor 10 and components external to the conduit 52 are preferably made using wires 54 extending from contacts 56 on the sensor 10 through a sealed orifice 58 in the conduit 52 to components located external to the conduit 52.

Therefore, the multiple technology flow sensor and method for determining flow rate formed in accordance with the present invention have generic applicability and do not require substantial modifications over a wide range of pressure, temperature, and flow rates. Further, the flow sensor and method for determining flow utilize both thermal and displacement sensing to measure temperature, pressure, and flow rate over an extended range of conditions. In addition, the multiple technology flow sensor and method for determining flow rate are able to simultaneously or sequentially characterize physical characteristics of gaseous media, such as temperature and pressure, which may be used to compensate for and significantly improve the accuracy of flow rate measurements.

Unifying the manufacturing processes for all sensors in the flow sensor formed in accordance with the present invention permits many of these processes to be performed simultaneously. Enclosing each of the sensors in a single housing substantially simplifies and reduces the cost of manufacturing the device when compared with conventional systems having discrete sensors. Combining multiple sensors also substantially reduces the size and space requirements of the resulting device since intermediate space, which is normally required for external wiring, can be eliminated.

Miniaturization of the flow sensor formed in accordance with the present invention enhances dynamic properties, such as reaction time and bandwidth. Integrating multiple sensors in the same device enables multiplexing of signals representing flow, pressure, and temperature without the need for additional wiring and/or interface hardware, much of which requires redundancy in conventional multi-sensor systems. Localizing multiple sensors within one device also standardizes and reduces the impact of environmental factors when compared with their effect on multiple sensors located at potentially diverse sites.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A flow sensor comprising:
   a flexible membrane; and
   a plurality of sensors, the plurality of sensors being positioned on the flexible membrane, at least one of the plurality of sensors being adapted for detecting ambient temperature, at least one of the plurality of sensors being adapted for detecting pressure of a medium, and at least one of the plurality of sensors being specifically adapted for sensing a flow rate of the medium independent of detecting ambient temperature and pressure.

2. The flow sensor as defined by claim 1, wherein the medium includes at least one of a gas, liquid, composition, and slurry.

3. The flow sensor as defined by claim 1, further comprising:
   a wafer, the wafer including a cavity; and
   a substrate, the wafer being bonded to the substrate, the cavity in the wafer being substantially covered by the substrate, at least a portion of the wafer disposed above the cavity including the flexible membrane.

4. The flow sensor as defined by claim 3, wherein at least one of the wafer and the substrate includes silicon.

5. The flow sensor as defined by claim 1, further comprising an isolation layer, the isolation layer being disposed between the at least one of the plurality of sensors and the flexible membrane.

6. The flow sensor as defined by claim 5, wherein the isolation layer includes silicon dioxide.

7. The flow sensor as defined by claim 1, wherein the plurality of sensors includes at least one resistor.

8. The flow sensor as defined by claim 1, wherein the plurality of sensors includes at least four resistors, the at least four resistors being operatively connected in a Wheatstone bridge configuration.

9. The flow sensor as defined by claim 8, wherein the at least four resistors include a first set of resistors and a second set of resistors, the first set of resistors being disposed at opposing sides of the Wheatstone bridge configuration, the second set of resistors being disposed at opposing sides of the Wheatstone bridge configuration, the first set of resistors comprising a first elongation, the second set of resistor comprising a second elongation, the first elongation being opposite in sense to that of the second elongation.

10. The flow sensor as defined by claim 9, wherein the first elongation is substantially equivalent to but opposite in sense from that of the second elongation.

11. The flow sensor as defined by claim 9, wherein at least one of the first elongation and the second elongation is determined by placement of the at least four resistors on the flexible membrane.

12. The flow sensor as defined by claim 9, wherein the medium includes a flow direction, the first set of resistors being longitudinally disposed substantially parallel with the flow direction, the second set of resistors being longitudinally disposed substantially perpendicular to the flow direction.

13. The flow sensor as defined by claim 1, wherein the at least one sensor adapted for detecting pressure is adapted for detecting deflection of the flexible membrane in response to the pressure of the medium.

14. The flow sensor as defined by claim 1, wherein the at least one sensor adapted for detecting ambient temperature is selectively isolated from the plurality of sensors.

15. The flow sensor as defined by claim 1, wherein the at least one sensor adapted for detecting the flow rate of the medium includes a constant temperature anemometer.

16. The flow sensor as defined by claim 1, wherein the plurality of sensors is operatively connected to the flexible membrane.

17. The flow sensor as defined by claim 1, wherein the flow sensor is adapted for mounting within a conduit.

18. A method of sensing a flow rate of a medium, the method comprising the steps of:
provinding a flexible membrane;
positioning a plurality of sensors on the flexible membrane;
detecting ambient temperature by at least one of the plurality of sensors;
detecting a pressure of a medium by at least one of the plurality of sensors; and
sensing a flow rate of the medium by at least one of the plurality of sensors specifically adapted for sensing the flow rate of the medium independent of detecting ambient temperature and pressure.

19. The method of sensing a flow rate of a medium as defined by claim 18, wherein the medium includes at least one of a gas, liquid, composition, and slurry.

20. The method of sensing a flow rate of a medium as defined by claim 18, further comprising the steps of:
providing a wafer, the wafer including a cavity;
providing a substrate; and
bonding the wafer to the substrate, the cavity in the wafer being substantially covered by the substrate, at least a portion of the wafer disposed above the cavity including the flexible membrane.

21. The method of sensing a flow rate of a medium as defined by claim 18, further comprising the step of disposing an isolation layer between at least one of the plurality of sensors and the flexible membrane.

22. The method of sensing a flow rate of a medium as defined by claim 18, wherein the plurality of sensors includes at least four resistors, the method further comprising the step of coupling the at least four resistors operatively in a Wheatstone bridge configuration.

23. The method of sensing a flow rate of a medium as defined by claim 22, wherein the at least four resistors include a first set of resistors and a second set of resistors, the method further comprising:
disposing a first set of resistors at opposing sides of the Wheatstone bridge configuration;
disposing the second set of resistors at opposing sides of the Wheatstone bridge configuration, the first set of resistors comprising a first elongation, the second set of resistor comprising a second elongation; and
providing the first elongation opposite in sense to that of the second elongation.

24. The method of sensing a flow rate of a medium as defined by claim 23, further comprising providing the first elongation as substantially equivalent to but opposite in sense from that of the second elongation.

25. The method of sensing a flow rate of a medium as defined by claim 23, further comprising determining at least one of the first elongation and the second elongation by placement of the at least four resistors on the flexible membrane.

26. The method of sensing a flow rate of a medium as defined by claim 23, wherein the medium includes a flow direction, further comprising:
disposing longitudinally the first set of resistors substantially parallel with the flow direction; and
disposing longitudinally the second set of resistors substantially perpendicular to the flow direction.

27. The method of sensing a flow rate of a medium as defined by claim 18, further comprising the step of detecting deflection of the flexible membrane by the at least one of the plurality of sensors detecting the pressure of the medium.

28. The method of sensing a flow rate of a medium as defined by claim 18, further comprising the steps of:
isolating selectively the at least one sensor adapted for detecting ambient temperature from the plurality of sensors; and
determining a resistance of the at least one sensor adapted for detecting ambient temperature, the resistance being representative of the ambient temperature.

29. The method of sensing a flow rate of a medium as defined by claim 18, wherein the step of detecting the flow rate of the medium by at least one of the plurality of sensors further comprises the steps of:
maintaining the at least one of the plurality of sensors detecting the flow rate of the medium at a predetermined temperature with a heating element; and
determining an electrical current through the heating element, the electrical current being representative of the flow rate of the medium.

30. The method of sensing a flow rate of a medium as defined by claim 18, further comprising the step of coupling the plurality of sensors operatively to the flexible membrane.

31. The method of sensing a flow rate of a medium as defined by claim 18, further comprising the step of compensating the flow rate detected by at least one of the plurality of sensors with at least one of the ambient temperature and the pressure of the medium.

32. A flow sensor comprising:
   a flexible membrane; and
   a plurality of sensors, the plurality of sensors being positioned on the flexible membrane, at least one of the plurality of sensors being adapted for detecting ambient temperature, at least one of the plurality of sensors being adapted for detecting pressure of a medium, and at least one of the plurality of sensors being specifically adapted for sensing a flow rate of the medium, the plurality of sensors including at least four resistors operatively connected in a Wheatstone bridge configuration.

* * * * *

UNITED STATES PATENT AND TRADEMARK OFFICE
CERTIFICATE OF CORRECTION

PATENT NO. : 6,901,794 B2  Page 1 of 1
DATED : June 7, 2005
INVENTOR(S) : Hans-Joerg Zobel et al.

It is certified that error appears in the above-identified patent and that said Letters Patent is hereby corrected as shown below:

<u>Column 3,</u>
Line 42, now reads "flow rate (O)," should read -- flow rate (Q), --.

Signed and Sealed this

Thirteenth Day of December, 2005

JON W. DUDAS
*Director of the United States Patent and Trademark Office*